United States Patent [19]

Shinoda

[11] Patent Number: 4,639,588
[45] Date of Patent: Jan. 27, 1987

[54] AUTOMATIC FOCUSING DEVICE WITH RANGE BOUNDARY SETTING

[75] Inventor: Nobuhiko Shinoda, Tokyo, Japan

[73] Assignee: Canon Kabushiki Kaisha, Tokyo, Japan

[21] Appl. No.: 642,270

[22] Filed: Aug. 20, 1984

[30] Foreign Application Priority Data

Sep. 5, 1983 [JP] Japan .................................. 58-162802

[51] Int. Cl.⁴ .............................................. G01J 1/20
[52] U.S. Cl. .................................. 250/201; 354/403; 356/4
[58] Field of Search ................ 250/201, 204; 354/409, 354/408, 407, 406, 405, 404, 403; 356/4

[56] References Cited

U.S. PATENT DOCUMENTS

| | | | |
|---|---|---|---|
| 4,284,335 | 8/1981 | Takemae et al. ................... | 250/201 |
| 4,293,206 | 10/1981 | Tokutomi et al. | |
| 4,294,527 | 10/1981 | Hashimoto et al. ............... | 354/409 |
| 4,300,823 | 11/1981 | Yamanaka et al. ................ | 354/403 |
| 4,314,748 | 2/1982 | Kawabata et al. ................. | 354/409 |
| 4,336,987 | 6/1982 | Shenk ................................ | 354/409 |
| 4,443,078 | 4/1984 | Niwa et al. ........................ | 354/408 |

Primary Examiner—David C. Nelms
Assistant Examiner—Michael Messinger
Attorney, Agent, or Firm—Fitzpatrick, Cella, Harper & Scinto

[57] ABSTRACT

An automatic imaging lens focusing device comprises a detector for detecting a near focus state, a far focus state or an in-focus state of an imaging lens to an object and producing a corresponding signal, a driver for driving the imaging lens in accordance with the signal from the detector, a lens position detector for detecting a position of the imaging lens, a memory for storing two lens positions detected by the lens position detection means in response to a store signal, a switch for producing the store signal and a control circuit for permitting the operation of the driver between the two lens positions stored in the memory while inhibiting the driver operation beyond the stored lens positions.

7 Claims, 12 Drawing Figures

FIG. I

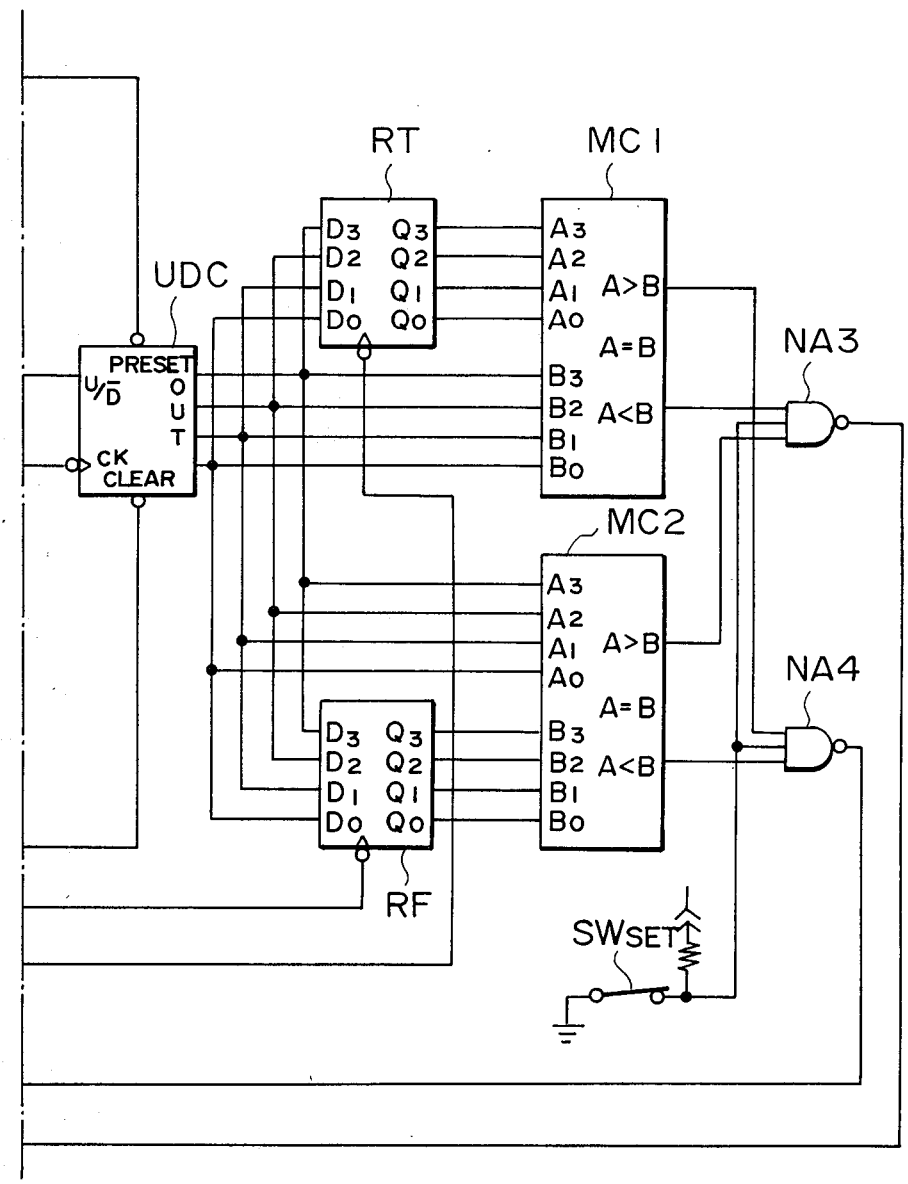
F I G. 2B

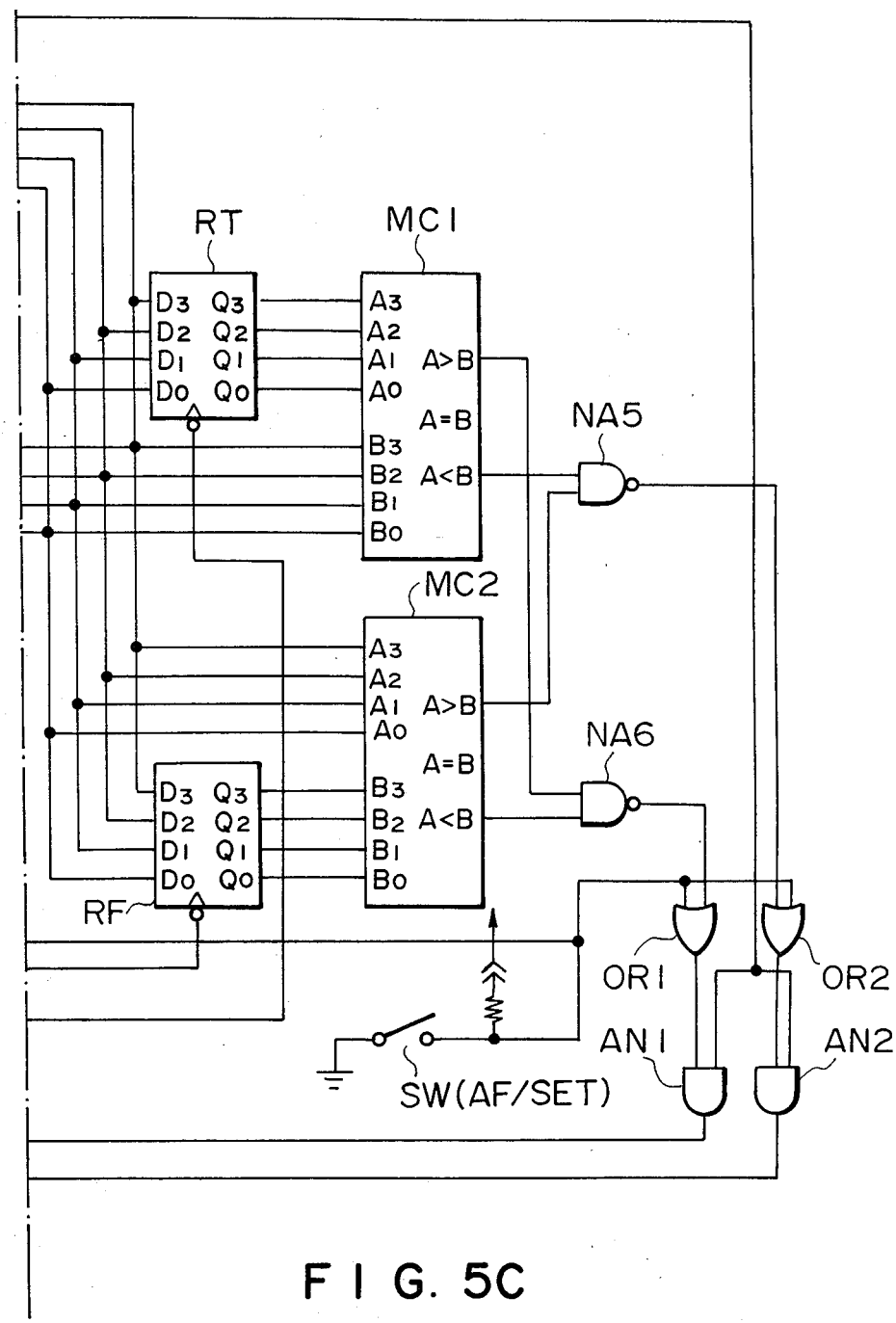
F I G. 5C

AUTOMATIC FOCUSING DEVICE WITH RANGE BOUNDARY SETTING

BACKGROUND OF THE INVENTION

1. Field of the Invention

The present invention relates to an automatic focusing device which performs an automatic focusing operation only when a main object is present within a range preset by a photographer.

2. Description of the Prior Art

An automatic focusing device usually focus an imaging lens based on focus information (image deviation, sharpness, etc.) on an object captured in a vicinity of an imaging field (hereinafter referred to as an object captured in a distance measurement view field). Accordingly if the object desired by the photographer (hereinafter referred to as a main object) is out of the center of the imaging field and cannot be captured in the distance measurement view field, the focusing operation is performed for an object which is different from the main object and captured in the distance measurement view field. In a single-lens reflex type camera which frequently uses a long focal length lens, the use of the automatic focusing device creates the following problems.

(1) Because of a high imaging magnification, it is difficult to continuously capture the main object in the distance measurement view field. Accordingly, the above defect remarkably appears.

(2) Because of a large amount of lens detection, the focusing time to the object captured in the distance measurement view field is long when the object which is significantly distant from the main object is captured in the distance measurement view field. Therefore, a long time is required to refocus the lens to the main object and a photographing chance may be lost.

In order to resolve the above problems, it has been proposed to classify the distance to the imaging object to a distant zone, an intermediate zone and a near zone, and the photographer designates one of those zones so that the focusing operation is performed within the designated zone.

For example, if the main object is located in the intermediate zone, the intermediate zone is previously designated and the focusing operation is performed while the main object is captured in the distance measurement view field. Even if the main object goes beyond the distance measurement view field, the focused distance is limited within the zone so that the focusing operation for the object which is significantly distant from the main object is prevented, to assure an acceptable focus condition to a photograph of the main object.

However, in this method, it is necessary to predict the zone of the main object. This requires a decision (distance prediction) which is contrary to the purpose of the automatic focusing device. Further, if the main object is located at a boundary of the zones and the main object moves even slightly when the main object has been captured in the distance measurement view field, the main object cannot be exactly focused.

For example, if the main object is located at the boundary of the distant zone and the intermediate zone and the distant zone is designated, and if the main object goes beyond the distance measurement view field, the significant defocused state for the main object is prevented because the focusing operation is permitted within the distant zone, but if the main subject moves into the intermediate zone while the main object is captured in the distance measurement view field, the exact focusing for the main object can no longer be performed.

As an approach to resolve the above problem, the inventor of the present invention has proposed to provide a control circuit which permits the movement of the lens within an allowable range for a preset distance so that the exact focusing operation is performed for the movement of the main object within the allowable range for the preset distance when the object is captured in the distance measurement view field, and if the main object goes beyond the distance measurement view field, the movement of the lens is inhibited at the limit position of the allowable range to prevent a significantly defocused state relative to the main object which is within the allowable range.

However, although the allowable range can be preset, it is difficult to determine the allowable range when the range of the object movement distance is very much larger. If the allowable range is set too narrowly, the imaging lens is stopped at the limit position of the allowable range if the object moves beyond the allowable range and the exact focusing operation is not attained in spite of the fact that the automatic focusing apparatus produces an exact focusing signal.

Since the depth of focus of the imaging lens is determined by a focal distance and a stop value, a high degree of consideration and experience are required to set the distance while taking the allowable range into consideration.

SUMMARY OF THE INVENTION

It is an object of the present invention to provide an automatic focusing device which enables free setting of an allowable operation range of the imaging lens.

It is another object of the present invention to provide an automatic focusing device which enables free setting of a limit position of a near distance and a limit position of a far distance which define an allowable operation range of an imaging lens.

It is another object of the present invention to provide an automatic focusing device having a first memory for storing a limit position of a near distance and a second memory for storing a limit position of a far distance.

It is another object of the present invention to provide an automatic focusing device which focuses an imaging lens to a near distance object to store a limit position of a near distance in a first memory and focuses the imaging lens to a far distance object to store a limit position of a far distance in a second memory.

DETAILED DESCRIPTION OF THE PREFERRED EMBODIMENTS

Figure 1:
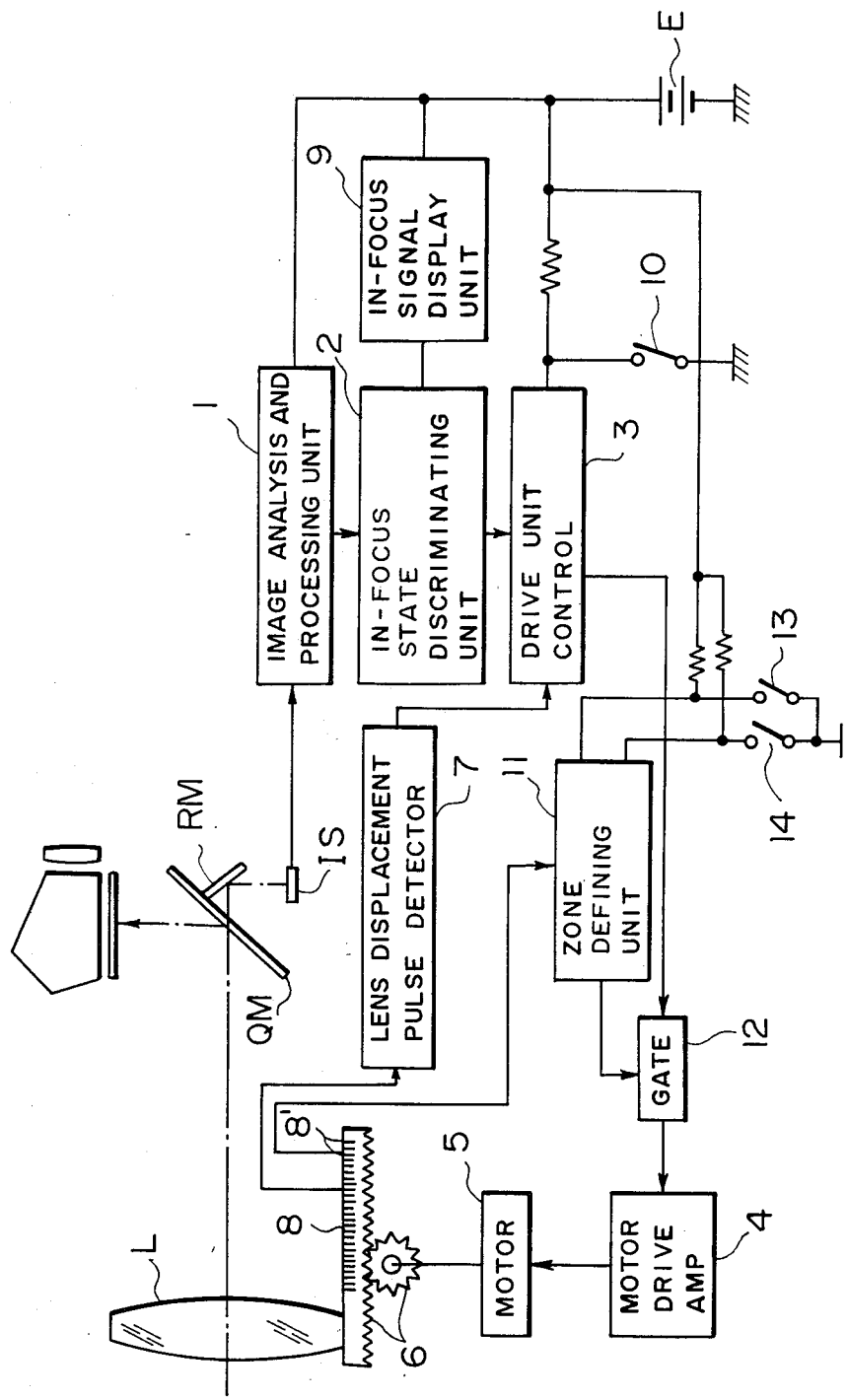
FIG. 1 is a block diagram of a first embodiment of an automatic focusing device of the present invention, FIG. 2 composed of FIGS. 2A and 2B is a circuit diagram of a zone defining unit of FIG. 1, FIG. 3 composed of FIGS. 3A and 3B is a circuit diagram of a second embodiment of the present invention.
Figure 2:
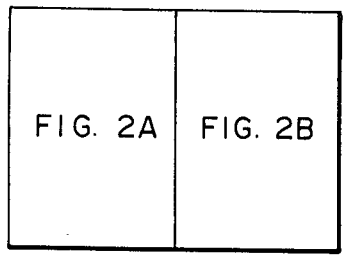

FIG. 1 is a block diagram of a first embodiment of the automatic focusing device of the present invention. FIG. 2 shows a detail of a zone defining unit 11 and an encoding plate 8 shown in FIG. 1. In FIGS. 1 and 2, numeral 1 denotes an image analysis and processing unit, numeral 2 denotes an in-focus state discriminating unit, numeral 3 denotes a drive control unit, numeral 4 denotes a motor drive amplifier, numeral 5 denotes a focusing motor, numeral 6 denotes a helicoid drive gear, numeral 7 denotes a lens displacement pulse detection unit for detecting the helicoid movement, numeral 8 denotes an encoding plate having a pulse signal set therein, numeral 9 denotes an in-focus signal display unit, numeral 10 denotes an automatic focusing switch, numeral 11 denotes a zone defining unit, numeral 12 denotes a gate for controlling the signal from the drive control unit 3, numerals 13 and 14 denote photographing distance range setting switches for a far distance and a near distance, respectively, E denotes a power supply battery, IS denotes a photosensor which receives an object image transmitted through a quick return mirror QM and reflected by a sub-mirror RM, and numeral 8' denotes a comb-shaped electrode of the encoding plate 8 having 16 electrodes. The electrode 8' is grounded as shown in FIG. 2. When the imaging lens is moved to an indefinite position, the electrode 8' contacts to an electrode SWI, and when the imaging lens is moved to a very near position, the electrode 8' contacts to an electrode SWC. Electrodes SWD and SWS are used to detect whether the comb-shaped electrode 8' is moved upward or downward as viewed in FIG. 2A, by an up/down counter UDC. When the comb-shaped electrode 8' moves upward, that is, when the imaging lens L moves toward the very near distance, the signal of the SWS changes from an H-level to an L-level if the signal of the SWD is at the L-level, and when the imaging lens moves toward the infinite, the signal of the SWS charges from the L-level to the H-level when the signal of SWD is at the L-level by the contact to the electrode 8'. The up/down counter UDC operates as an up-counter when a signal of a terminal U/S connected to the electrode SWD is at the H-level, and operates as a down-counter when it is at the L-level.

When the imaging lens moves toward the very near distance and the comb-shaped electrode 8' contacts to the electrodes SWC, the counter is preset to all "1"s, and when the imaging lens moves toward the infinite and the comb-shaped electrode 8' contact to the electrode SWI, the counter is cleared.

A terminal OUT is an output terminal for outputting the content of the up/down counter UDC, RT denotes a register for latching the content of the up/down counter UDC when the switch SWT 14 is turned on, and RF is a register for latching the content of the up/down counter UDC when the switch SWF 13 is turned on. MC1 and MC2 denote magnitude comparators. MC1 receives data from output terminals $Q_0$–$Q_3$ of the register RT at terminals $A_0$–$A_3$ and data from the output terminal OUT of the up/down counter UDC at terminals $B_0$–$B_3$. MC2 receives the data from the output terminal OUT of the up/down counter UDC at terminals $A_0$–$A_3$ and the data from the output terminals $Q_0$–$Q_3$ of the register RF at terminals $B_0$–$B_3$.

When the data at the terminals $A_0$–$A_3$ is larger than the data at the terminals $B_0$–$B_3$, MC1 and MC2 produce the H-level signals at terminals $A>B$, when those data are equal, they produce the H-level signals at terminals $A=B$, and when the data at the terminals $A_0$–$A_3$ is smaller than the data at the terminals $B_0$–$B_3$, they produce the H-level data at terminals $A<B$.

NA3 denotes a NAND gate which NANDs the signal at the terminal $A<B$ of the magnitude comparator MC1, the signal at the terminal $A>B$ of MC2 and a signal at a switch SWset to be described later, and NA4 denotes a NAND gate which NANDs the signal at the terminal $A>B$ of the magnitude comparator MC1, the signal at the terminal $A<B$ of MC2 and the signal at the switch SWset.

The switch SWset is used by the photographer to start the focusing operation of the lens to determine the focusing range. When it is turned on, the NAND gate NA3 and NA4 produce the H-level outputs. Thus, NA1 and NA2 gate the signals from the in-focus state discrimination circuit 2.

As the photographer focuses the imaging lens to a desired very near distance and turns on the switch 13, the position is stored in the register RF.

Similarly, as the photographer focuses the lens to the infinite distance and turns on the switch 14, the position is stored in the register RT.

The operation of the first embodiment of the present invention is now explained.

When the photographer designates the distance measurement zone by using the automatic focusing device of the present invention, he/she first turns on the switch SWset. Thus, the inputs to the NAND gates NA3 and NA4 are rendered L-level and the outputs are at the H-level. Then, the distance measurement zone of the imaging lens is set to the nearest object in the imaging range. Thus, the in-focus state discrimination circuit produces a signal to drive the imaging lens toward the infinite distance or the very near distance and the signal is applied to the NAND gate NA1 and NA2. Assuming that the nearest object is located closer to the camera than the focusing position of the imaging lens, the H-level signal for causing the imaging lens to be driven toward the very near distance is applied to one input terminal of the NAND gate NA2 from the terminal 18. Accordingly, the output of the NAND gate NA2 is rendered L-level and a current flows through a resistor $R_2$, Tr2 is turned on, Tr3 is turned on through a resistor $R_3$ and a current flows to a motor 5 through a path of power supply - Tr2 - Motor 5 - Tr3 - ground. Thus, the motor is rotated forward to drive the imaging lens toward the very near distance into the in-focus position.

Figure 2A:
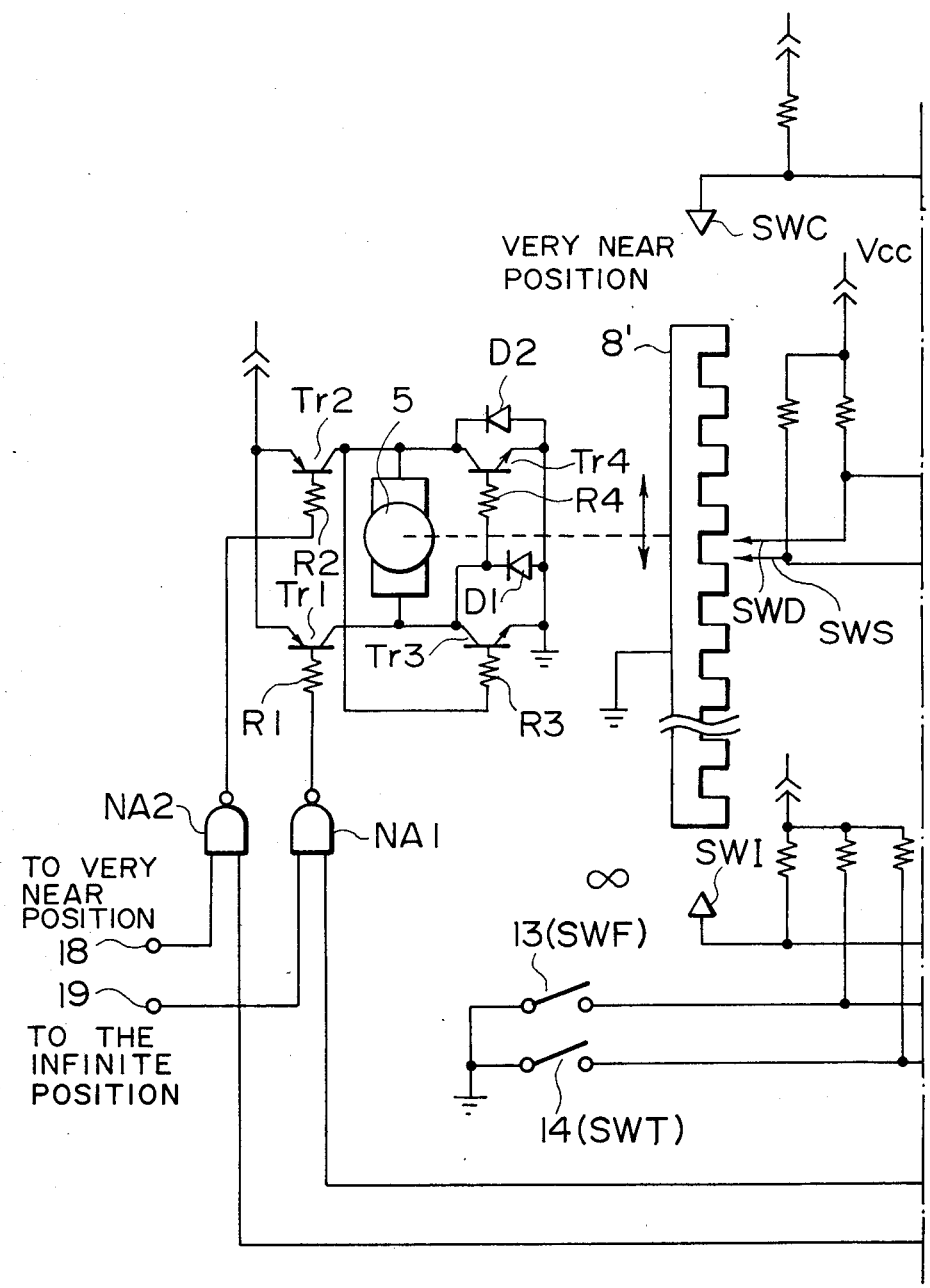
Figure 3A:
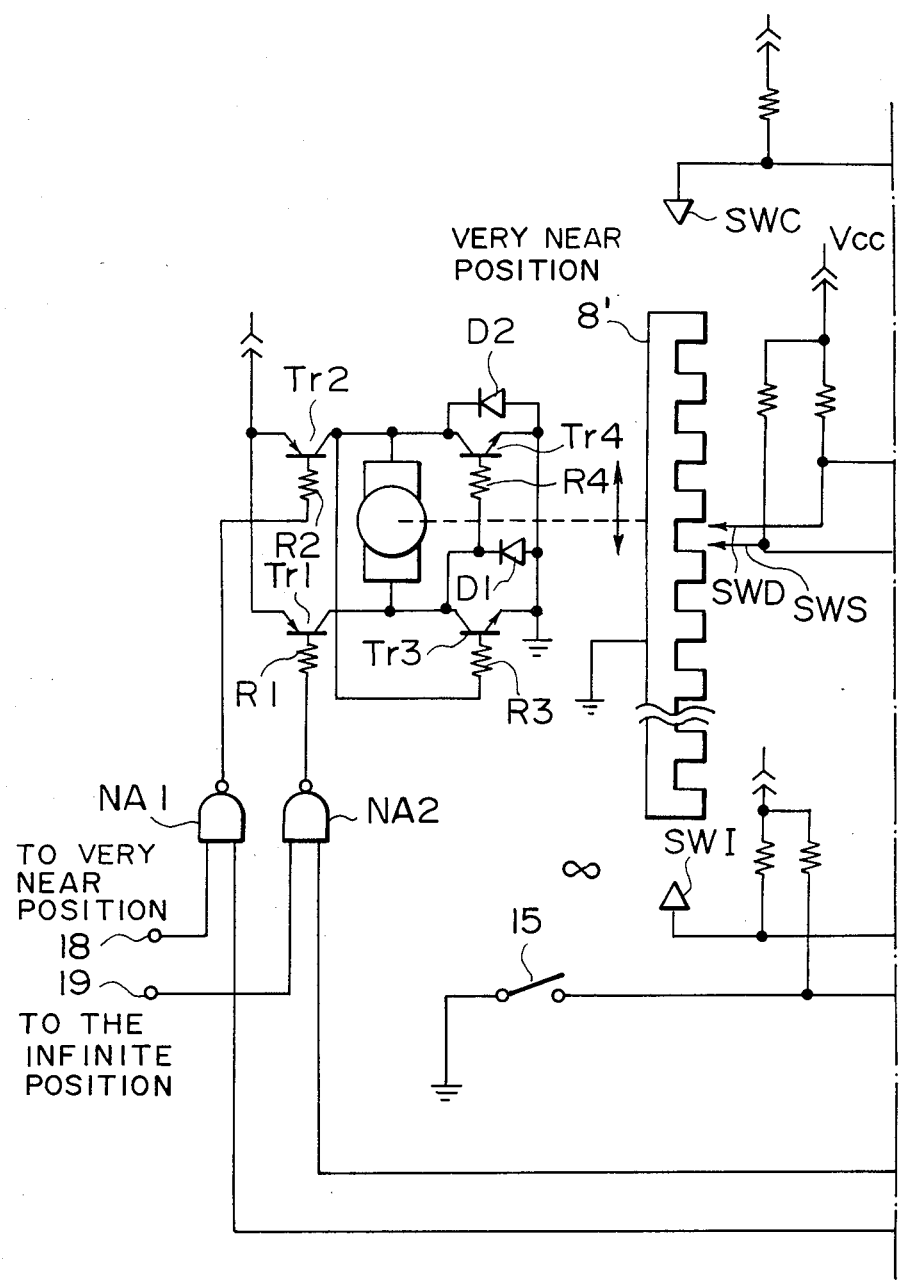
Figure 3B:
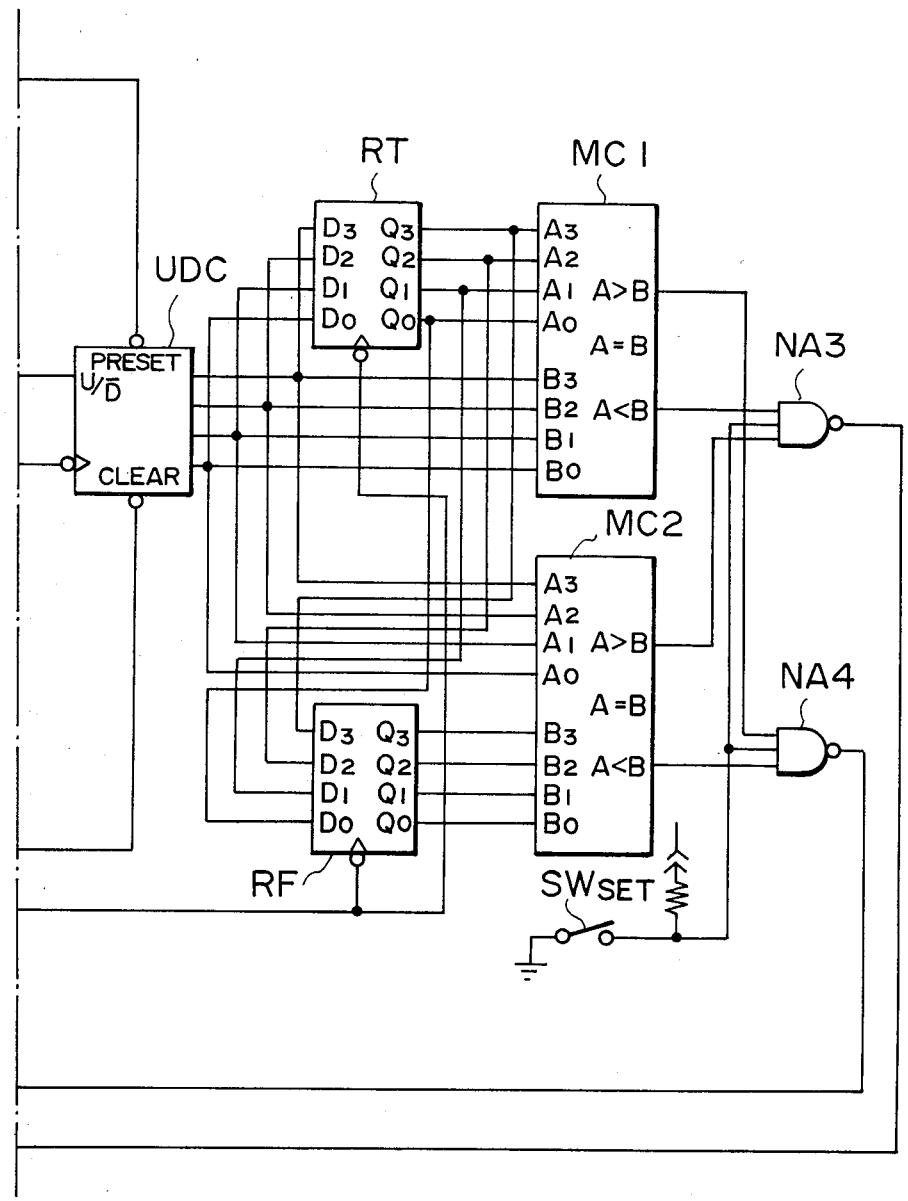
Figure 5A:
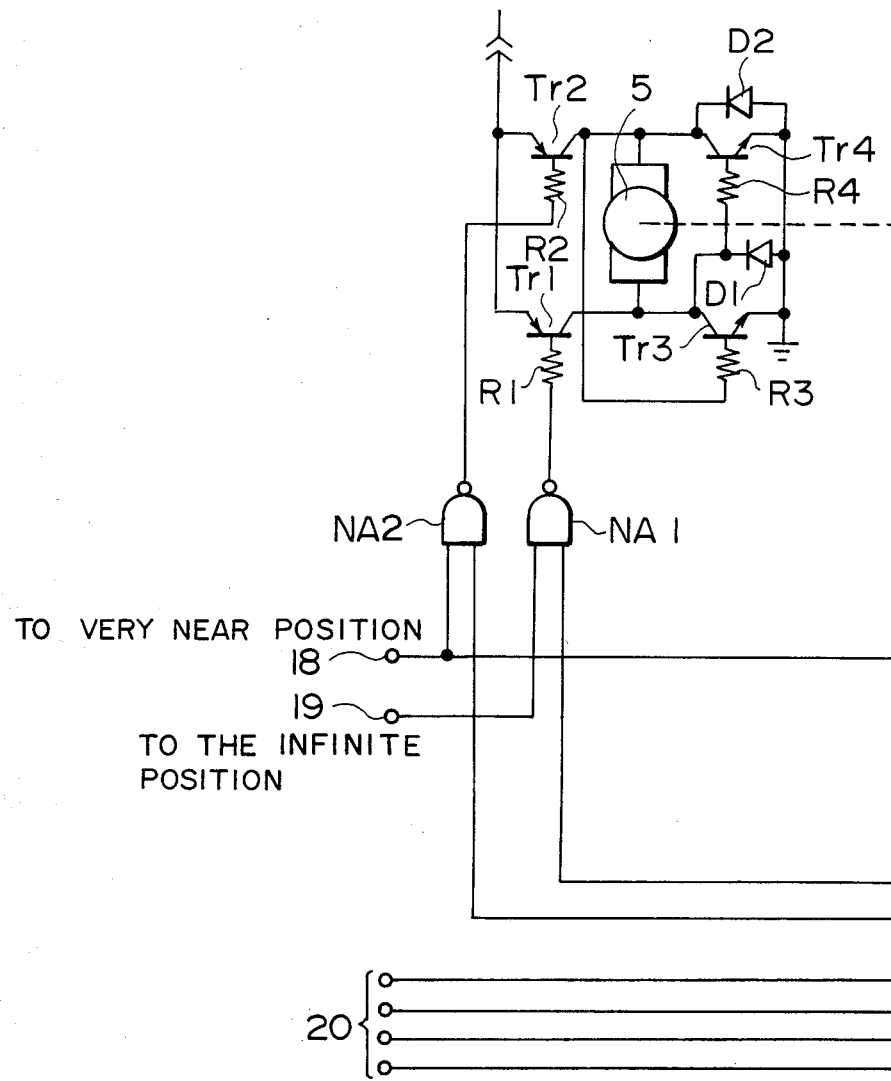
Figure 5B:
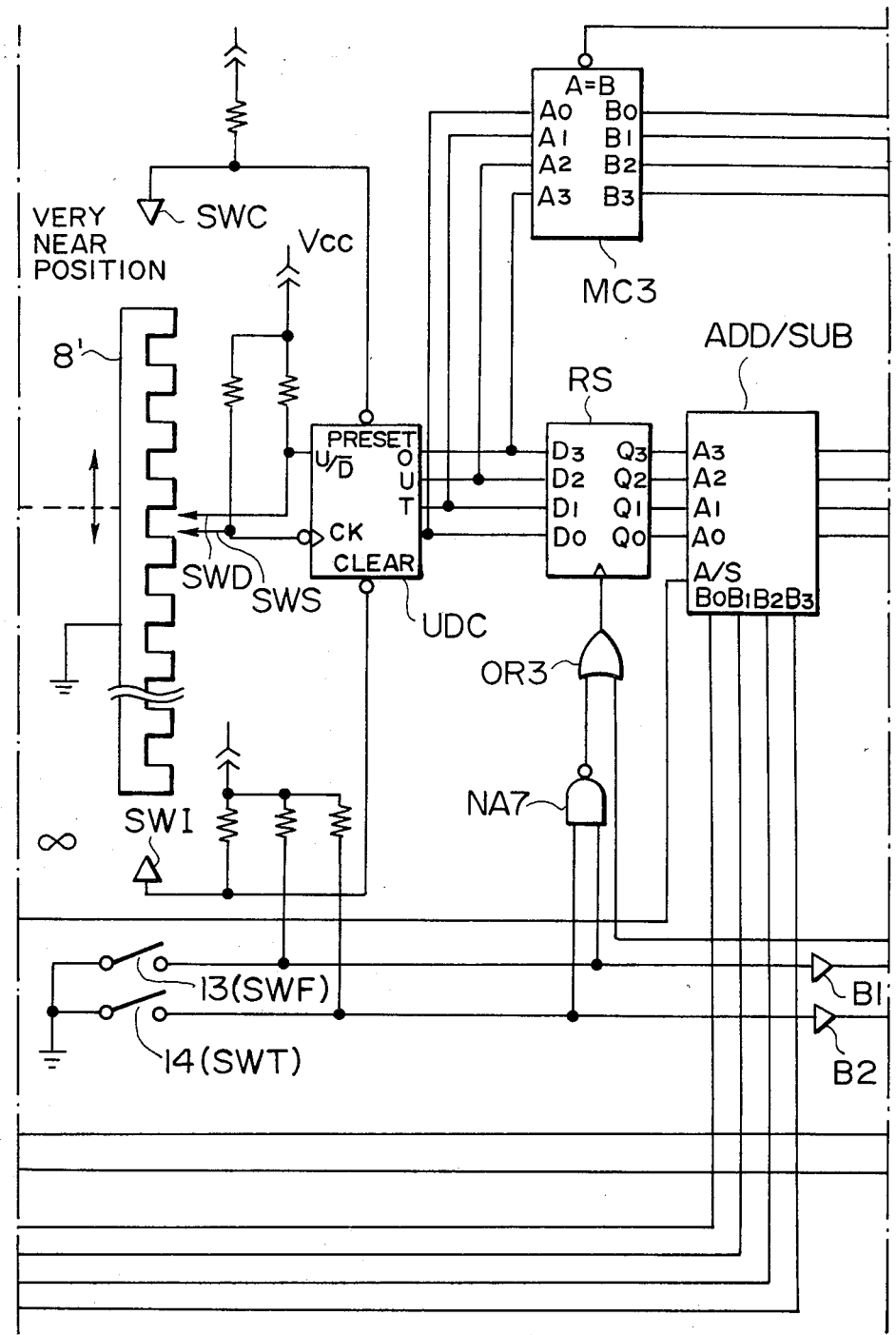

Accordingly, the comb-shaped electrode 8' is upward as viewed in FIG. 2A with the imaging lens and the signal is applied to the up/down counter UDC through the electrodes SWD and SWS. When the electrode SWD does not yet contact to the comb-shaped electrode 8', that is, when the terminal U/D of the up/down counter UDC is at the H-level, the clock from the electrode SWS is applied to the up/down counter UDC and the up/down counter UDC operates as the up-counter. When the imaging lens is focused to the nearest object, the signals produced at the terminals 18 and 19 of the in-focus state discrimination circuit are at the L-level and the outputs of the NAND gates NA1 and NA2 are at the H-level. Thus, Tr1, Tr2, Tr3 and Tr4 are turned off and the motor 5 is deenergized and stops rotating. When the photographer depresses the switch (SWF) 13 after the termination of the focusing operation of the imaging lens, the signal at the clock terminal of the register RF changes from the H-level to the L-level and the content of the up/down counter UDC is latched in the register RF.

As the photographer sets the distance measurement zone of the imaging lens to the farthest object, the in-focus state discrimination circuit produces the H-level signal at the terminal 19. As the photographer depresses the switch SWset, the outputs of the NAND gates NA3 and NA4 change to the H-level the output of the NAND gate NA2 remains at the H-level and the output of the NAND gate NA1 changes to the L-level. Accordingly, Tr1 is turned on and Tr4 is also turned on. As a result, a current flows to the motor 5 through a path of power supply - Tr1 - motor 5 - Tr4 - ground so that the motor 5 is rotated reversely and the imaging lens is driven toward the infinite position.

Since the comb-shaped electrode 8' is moved downward as viewed in FIG. 2A, the signal from the electrode SWS is applied to the up/down counter UDC when the electrode SWD contacts to the comb-shaped electrods 8', that is when the terminal U/D of the up/down counter UDC is at the L-level and the up/down counter UDC is in the down count mode.

When the imaging lens is focused to the farthest object, the in-focus state discrimination circuit produces the L-level signals at the terminals 18 and 19, the NAND gates NA1 and NA2 produce the H-level outputs and the motor 5 stops rotating.

As the photographer depresses the switch 14 (SWT) after the termination of the focusing operation of the imaging lens, the signal at the clock terminal of the register RT changes from the H-level to the L-level and the content of the up/down counter UDC is latched in the register RT.

Thus, the setting of the drive range of the imaging lens is completed. If the photographer sets the distance measurement view field of the imaging lens to an object which is nearer than the preset drive range and starts the focusing operation, the in-focus status discrimination circuit produces the the H-level signal at the terminal 18, the NAND gate NA2 produces the L-level output, the motor is rotated to move the imaging lens toward the very near position, and the comb-shaped electrode 8' is moved upward. Thus, the count of the up/down counter UDC is increased, and when it reaches the preset drive range of the imaging lens, the terminal A>B of the magnitude comparator MC2 produces the H-level output. Since the terminal A<B of the magnitude comparator MC1 produces the H-level output and the set switch SWset is open, the NAND gate NA3 produces the L-level output and the output of the NAND gate NA2 changes from the L-level to the H-level. Thus, the motor 5 stops rotating and the imaging lens is no longer driven to the very near position.

When the distance measurement view field of the imaging lens is set to an object which is farther than the preset drive range, the imaging lens is similarly not driven beyond the preset drive range.

Figure 3:
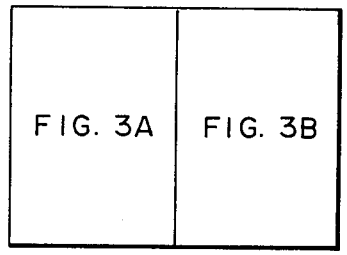

FIG. 3 shows a circuit diagram of a second embodiment of the present invention.

In FIG. 3, instead of setting the very near zone and the distant zone by the switches 13 and 14 as is done in the first embodiment, the very near zone and the distant zone are set by a single switch.

In FIG. 3, the connection of the up/down counter UDC and the registers RT and RF in the circuit diagram of the first embodiment of the present invention shown in FIG. 2 is changed such that when the switch 15 is first turned on, the output of the up/down counter UDC is supplied to the register RT, and when the switch 15 is next turned on, the output of the up/down counter UDC is supplied to the register RT and the content latched in the register RT when the switch 15 was first turned on is latched in the register RF. Other operations are identical to those of the first embodiment.

In accordance with the present embodiment, since the drive range of the imaging lens can be set by the single switch, the operability is improved.

Figure 4:
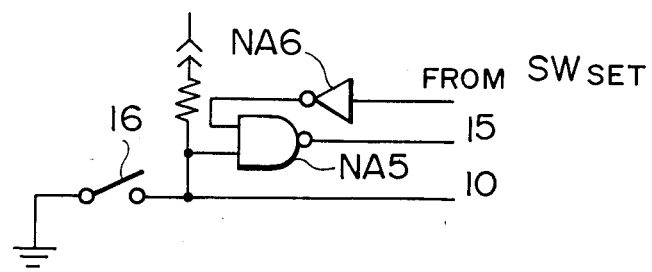
FIG. 4 is a circuit diagram of a third embodiment of the present invention, and FIG. 5 composed of FIGS. 5A, 5B and 5C is a circuit diagram of a fourth embodiment of the present invention.

FIG. 4 shows a circuit diagram of a third embodiment of the present invention.

In FIG. 4, the operability of the switches 13 and 14 and the switch 10 in the embodiment shown in FIG. 1 is improved. Except the switches, the circuit is identical to that of the first embodiment and hence it is not shown. In FIG. 4, the switch comprises a NAND gate NA5, an inverter NA6 and a switch 16. When the switch 16 is turned on, the signal at the terminal 10 which is equivalent to the signal of the switch 10 shown in FIG. 1 assumes the L-level and the drive control unit 3 shown in FIG. 1 operates to perform the focusing operation.

In the set switch SWset is on, the output of the NAND gate NA5, that is, the signal at the terminal 15 which is equivalent to the signal of the switch 5 shown in FIG. 3 changes from the H-level to the L-level when the switch 16 is turned off after it has been turned on, and the content of the up/down counter UDC is latched in the registers RF and RT.

In accordance with the present embodiment, like in the previous embodiment, the photographer pushes in the switch 16 to turn it on in order to set the focusing operation range, the imaging lens is focused to the very near object, thereafter the photographer releases the switch 16 to turn it off, the content of the very near distance up/down counter UDC is stored in the register RT, the imaging lens in directed to the distant object and the above operation is repeated so that the very near point and the distant point are stored in the registers RF and RT, respectively. Accordingly, the complicated switching operation in the previous embodiment is simplified.

Figure 5:
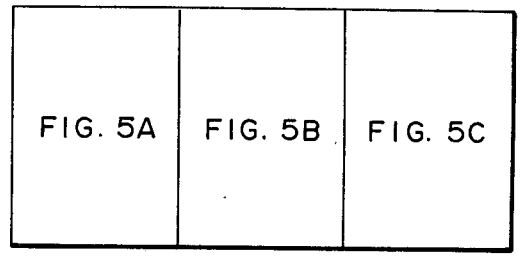

Referring to FIG. 5, a third embodiment of the present invention. The like elements to those shown in FIG. 4 are not explained here. Numeral 20 denotes a terminal to which a 4-bit signal representing an image deviation. That is, a deviation of the imaging lens from the in-focus point, supplied from the in-focus state discrimination circuit. Such an infocus state discrimination circuit is disclosed in U.S. patent application Ser. No. 464,578 filed on Feb. 7, 1983. The output V in the above application in used after the A/D conversion. A signal ( bits $B_0$–$B_3$) at the terminal 20 indicates a sign of the image deviation. RS denotes a register which latches the output of the up/down counter UDC when the switch 13 or 14 is turned on. ADD denotes an adder/subtractor which digitally adds or subtracts the content of the register RS and the signal from the terminal 20 depending on a signal at a terminal A/$\overline{S}$, that is, adds when the signal at the terminal A/$\overline{S}$ is at the H-level and subtracts when it is at the L-level. MC3 denotes a magnitude comparator which compares the output of the adder/subtractor ADD with the output of the up/down counter UDC and produces the H-level signal at a terminal A=B when A≠B and the L-level signal when A=B. B1 and B2 denote buffers for delaying the signals from the switches 13 (SWF) and 14 (SWT) for a sufficient time to assure the operation by the adder/ subtractor ADD. SW AF/SET denotes a switch for selecting an AF mode in which the lens of the automatic focusing device is actually driven and a set mode in which the drive range of the imaging lens is set. When it is turned on, the set mode is selected, and when it is turned off, the AF mode is set AN1 and AN2 denote AND gates. When the magnitude comparator MC3 produces the L-level signal, that is, when A=B, or when the object is beyond the preset drive range, the L-level signal is applied to the inputs of the NA1 and NA2 to inhibit the drive of the motor 5. OR1 and OR2 denote OR gates which produce the H-level signals in the AF mode irrespective of the position of the imaging lens in response to the signal of the SW AF/SET and change the levels of the output signals in the set mode in accordance with the signals from NA5 and NA6. NA7 denotes a NAND gate which gates the clock to the register RS in response to the depression of the switches 13 (SWF) and 14 (SWT), and OR3 denotes an OR gate which ORes the output of the NAND gate NA7 and the signal of the switch SW AF/SET.

The operation of the present embodiment is now explained.

When the drive range of the imaging lens is not to be set, the switch SW AF/SET is turned off. Accordingly, the OR gates OR1 and OR2 produces the H-level signals, the outputs of the AND gates AN1 and AN2 are determined by the signal at the terminal A =B of the magnitude comparator MC3 and the lens is driven. In response to the rise of the pulse generated by the turn-off of the switch SW AF/SET, the register RS latches the information representing the current position. The lens position information latched in the register RS is added to or subtracted from the image deviation information supplied from the terminal 20 so that the adder/subtractor ADD produces the in-focus lens position information signal. The motor 5 is driven in accordance with the signals supplied from the terminals 18 and 19 through the NAND gates NA1 and NA2, and the comb-shaped electrode 8' is driven therewise and the pulse generated thereby is counted by the up/down counter UDC. When the count of the up/down counter UDC and sum/difference of the adder/subtractor ADD watch, the output of the magnitude comparator MC3 changes from the H-level to the L-level, the outputs of the AND gates AN1 and AN2 assume the L-level, the outputs of the NAND gates NA1 and NA2 assume the H-level, the motor 5 stops to rotate and the imaging lens is moved to the in-focus position and stopped there. Thus, the focusing operation is terminated. If the object moves or the imaging lens is defocused from the object by some reason, the photographer again depresses the switch SW AF/SET so that the new lens position information is latched in the register RS and the focusing operation is performed again.

The set mode in which the drive range of the imaging lens is set is now explained.

In the set mode, the switch SW AF/SET is turned on. Accordingly, the outputs of the OR gates OR1 and OR2 change depending on the outputs of the magnitude comparators MC1 and MC2.

In the set mode, as in the first and second embodiments, the distance measurement zone of the object is set to the nearest object in the photographing range and the switch 13 (SWF) is depressed so that the current lens position information is latched in the register RS and it is added to or subtracted from the signal supplied to the terminal 20 and the sum/difference is latched in the register RF.

Similarly, the distance measurement zone of the imaging lens is set to the farthest object in the photographing range and the switch 14 (SWT) is depressed so that the current lens position information is latched in the register RT.

If the object is within the drive range, the outputs of the NAND gates NA5 and NA6 are at the H-level. Thus, the operation is similar to that is the AF mode and hence it is not explained here.

The position of the object set in the distance measurement zone of the imaging lens is operated in the adder/subtractor ADD as absolute distance information. If it is beyond the drive range stored in the registers RT and RF, one of the NAND gates NA5 and NA6 produces the L-level signal depending on the outputs of the magnitude comparators MC1 and MC2.

If the object is nearer than the drive range, the NAND gate NA5 produces the L-level signal. Therefore, even if the H-level signal is applied to the terminal 18, the output of the NAND gate NA2 is kept at the H-level and the motor 5 is not driven.

If the object is farther than the drive range, the NAND gate NA6 produces the L-level signal. Accordingly, even if the H-level signal is applied to the terminal 19, the output of the NAND gate NA1 is kept at the H-level and the motor 5 is not driven.

In accordance with the present embodiment, unlike in the first and second embodiments in which the imaging lens is driven even for the object beyond the drive range, the automatic focusing operation is not carried out for the object beyond the drive range. Accordingly, the consumption of the power supply battery is prevented and the inadvertent movement of the imaging lens is also prevented so that the operability is improved.

In the embodiments of the present invention, the comb-shaped electrode 8', the electrodes SWS and SWD and the up/down counter UDC are used as the position detection means for detecting the position of the imaging lens. However, it is not always necessary to use the comb-shaped electrode but the drive amount of the imaging lens may be detected by using a photo-coupler or a magnetic sensor.

The switches 13 and 14 are used in the first embodiment and the switch 15 is used in the second embodiment as the information entry means for storing the output from the selected position detection means in the memory means, that is, the registers RT and RF as the first and second memory means. In the third embodiment, the information entry means comprises the switch 16, the resistor $R_6$, the NAND gate NA5 and the inverter NA6.

The NAND gates NA1, NA2, NA3 and NA4 are used as the inhibit means to inhibit the automatic focusing operation beyond the range stored in the memory means.

In accordance with the present invention, the automatic focusing device which detects the in-focus position and automatically drives the imaging lens in accordance with the detected position comprises the position detection means for detecting the position of the imaging lens, the first and second memory means for storing the outputs of the position detection means, the information entry means for storing the selected outputs of the position detection means in the memory means, and the inhibit means for inhibiting the automatic focusing operation beyond the position of the imaging lens stored in the first and second memory means. Accordingly, the photographer determines, through the imaging lens, the position of the nearest object and the position of the farthest object. Thus, the drive of the imaging lens to the in-focus position from the position beyond the preset range. In the prior art control circuit which allows the movement of the imaging lens within the predetermined allowable range for the preset distance, the skill is required to set the distance while the depth of focus and the allowable range being taken into consideration. In the present invention, such a skill is not required and the automatic focusing operation time can be reduced.

What I claim is:

1. An automatic focusing device for an imaging lens, comprising:
   (a) focus state detection means for producing a signal representing a focus adjusting state of the imaging lens;
   (b) driving means for moving the imaging lens to an in-focus position on the basis of the adjusting state signal;
   (c) memory means;
   (d) signal forming means for producing a memory signal, said memory signal being used for causing said memory means to store first in-focus position information and second in-focus position information, the first in-focus information being obtained from an output of said focus state detection means which corresponds to the object-position of a predetermined object, and the second in-focus state position information being obtained from an output of said focus state detection means which corresponds to another object-postion different from the object-position of the predetermined object; and
   (e) control means for permitting a lens moving operation of said driving means on the basis of the output of said focus state detection means, when the output is of a value between the outputs respectively corresponding to the first and second in-focus state position information.

2. A device according to claim 1, wherein said memory means includes first and second memories which respectively memorize the first and second in-focus position information, said device further comprising signal forming means for detecting a position of the imaging lens to form a position signal, and said control means comprising comparing means for comparing the position signal with said in-focus state position information stored in said memories to produce an enable signal for enabling the operation of said driving means when the signal state of said position signal is between the signal states of the first and second in-focus state information stored in said first and second memories.

3. An automatic focusing device for an imaging lens, comprising:
   (a) focus state detection means for producing a signal representing a focus adjusting state of the imaging lens;
   (b) driving means for moving the imaging lens to an in-focus position on the basis of the adjusting state signal;
   (c) signal forming means for forming information representing a position of the imaging lens;
   (d) memory means;
   (e) memory control means for causing said memory means to store first position information and second position information, the first position information being information which is output from said signal forming means when the imaging lens has been moved to an in-focus position on the basis of an output from said focus state detection means which corresponds to an object-position of a predetermined object, and the second position information being information which is output from said signal forming means when the imaging lens has been moved to an in-focus position on the basis of an output from said focus state detection means which corresponds to another object-position different from the object-position of the predetermined object;
   (f) control means for permitting a lens moving operation of said driving means on the basis of the output of said focus state detection means, when said output is of a value between the outputs respectively corresponding to the first and second in-focus state position information.

4. A device according to claim 3, wherein said signal forming means comprises digital means for forming the position information of the imaging lens as a digital value by changing the digital value according to the displacement of the imaging lens.

5. An automatic focusing device for an imaging lens, comprising:
   (a) an auto-focusing unit having sensing means for sensing the focusing state of the imaging lens;
   (b) a memory circuit for memorizing first information corresponding to an output of said sensing means which is put out on the basis of a first object, and second information corresponding to an output of said sensing means which is out put on the basis of a second object; and
   (c) enabling means for enabling the focusing operation of said auto-focusing unit to be performed between the first and second information after the first and second information have been stored in said memory circuit.

6. A device according to claim 5, wherein said auto-focusing unit drives the imaging lens on the basis of an output of said sensing means, and detects the position of the imaging lens to stop the driving of the imaging lens when the imaging lens has reached the in-focus position in response to an output of said sensing means, and said memory circuit stores an information corresponding to the position of the imaging lens when the auto-focusing operation of said auto-focusing unit for positions of said first and second objects has been performed.

7. An automatic focusing device for an imaging lens, comprising:
   (a) an auto-focusing unit;
   (b) memory means for storing plural distance information corresponding to the distances to first and second objects, which are produced by said auto-focusing unit; and
   (c) enabling means for enabling the focusing operation of said auto-focusing unit with respect to an object to be photographed which is at a distance between the distance information stored in said memory means.

* * * * *

UNITED STATES PATENT AND TRADEMARK OFFICE
CERTIFICATE OF CORRECTION

PATENT NO. : 4,639,588
DATED : January 27, 1987
INVENTOR(S) : NOBUHIKO SHINODA

It is certified that error appears in the above-identified patent and that said Letters Patent is hereby corrected as shown below:

COLUMN 1

Line 12, "focus" should read --focuses--.

COLUMN 4

Line 6-8, "sig- nal. ¶ at" should read --signal at--.

COLUMN 5

Line 22, "electrods" should read --electrode--.

COLUMN 6

Line 49, "deviation." should read --deviation is applied.--.
    Line 52, "infocus" should read --in-focus--.

COLUMN 7

Line 9, "set AN1" should read --set. AN1--.
    Line 29, "produces" should read --produce--.
    Line 51, "to rotate" should read --rotating--.

UNITED STATES PATENT AND TRADEMARK OFFICE
CERTIFICATE OF CORRECTION

PATENT NO. : 4,639,588.
DATED : January 27, 1987
INVENTOR(S) : NOBUHIKO SHINODA

It is certified that error appears in the above-identified patent and that said Letters Patent is hereby corrected as shown below:

COLUMN 9

Line 11, "the skill" should read --skill--.

COLUMN 10

Line 37, "out put" should read --output--.

Signed and Sealed this

Twenty-third Day of February, 1988

Attest:

DONALD J. QUIGG

Attesting Officer — Commissioner of Patents and Trademarks